Sept. 29, 1931.  J. W. MADDOX  1,825,193
TRAP
Filed Oct. 21, 1929
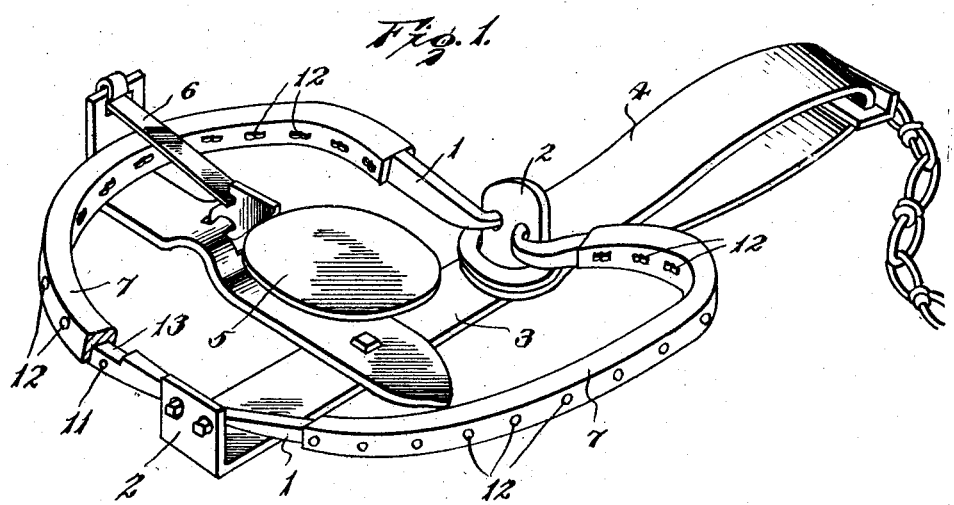
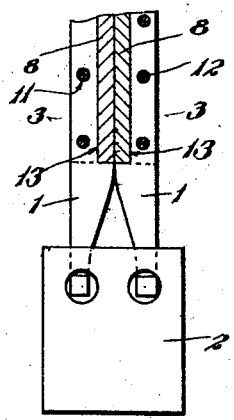 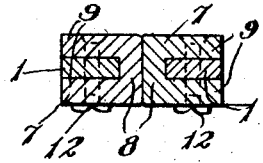 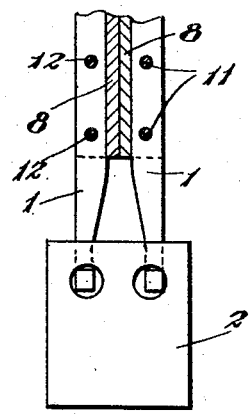
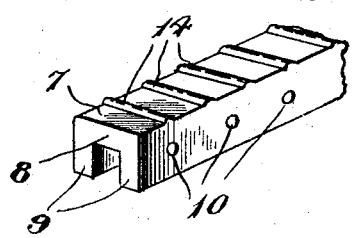
Inventor
J. W. Maddox
By Lacy & Lacy, Attorneys Patented Sept. 29, 1931

1,825,193

UNITED STATES PATENT OFFICE

JOHN W. MADDOX, OF MARION, MARYLAND

TRAP

Application filed October 21, 1929. Serial No. 401,239.

This invention relates to traps and more particularly to a trap of the type having spring-actuated jaws adapted to grip a foot or other portion of an animal between them.

At the present time it is customary to catch animals by means of traps having jaws held apart and adapted to be moved towards each other by a strong spring in order to grip the foot or leg of an animal stepping upon a trigger of the trap, but it has been found that although this type of trap is very effective in catching animals it often happens that a leg bone will become broken or the metal jaws will cut into the flesh around the bone to such an extent that an animal can tear itself loose from the trap although leaving its foot and a portion of its leg still in the trap.

Therefore, one object of the invention is to provide a trap with a binding or covering for its jaws which prevents the bone being broken or the flesh being torn while at the same time allows the jaws to very firmly grip the leg or foot of an animal caught in the trap and prevent likelihood of the animal escaping.

Another object of the invention is to so form the bindings or covers for the jaws that they may be applied to traps of a conventional construction and very firmly secured to the jaws.

Another object of the invention is to allow the bindings to be so applied to the jaws of the trap that they may be closed their full extent and thereby very firmly grip the foot or leg of an animal and to further so form the surfaces of the bindings which contact with the animal's leg that a very firm grip may be obtained thereon when the jaws are closed.

The invention is illustrated in the accompanying drawings, wherein

Figure 1 is a perspective view of a spring jaw trap having its jaws provided with bindings in accordance with this invention, Figure 2 is a fragmentary view showing the jaws of the trap closed and the bindings for the jaws in section, Figure 3 is a transverse sectional view taken through the jaws on the line 3—3 of Figure 2, Figure 4 is a view similar to Figure 2 showing a modified construction, and Figure 5 is a perspective view of a fragment of the improved binding for the jaws.

The trap which is shown in Figure 1 is of a conventional construction and includes jaws 1 having their ends pivotally connected with upstanding ears 2 at the ends of a bar or strip 3 and these jaws are adapted to be moved towards each other to grip the foot of an animal between them by a spring 4 when an animal steps upon the trigger 5 and releases the latch 6 which extends across one of the jaws when the trap is set. These jaws are formed of strong metal and move together at such speed when the latch is released that very often the leg bone of an animal will be broken and allow the animal to very easily tear its leg loose from the trap or gnaw it through. It has also been found that even if the bone of an animal's leg is not broken when the jaws close, the sharp corners of the jaws will cut into the flesh to such an extent that the animal in its struggles to get free can break the bone and escape. In order to prevent the jaws from breaking the bone of an animal's leg or cutting deeply into the flesh while at the same time allowing the jaws to firmly grip the animal's leg, there have been provided bindings 7 which are formed of a soft but strong material such as rubber or leather. These bindings are U-shaped in cross section so that they may straddle the jaws as shown in Figures 1 and 3 and are of such length that they extend practically the full length of each jaw. By this construction the bindings when applied to the jaws have their intermediate portions 8 disposed in covering relation to the inner gripping faces of the jaws and portions 9 covering the upper and lower faces of the jaws. Openings 10 are formed through the portions 9 of the bindings which register with openings 11 formed through the two jaws and through the registering openings of the bindings and jaws are passed fasteners 12 the shanks of which are split longitudinally so that while the fasteners may securely hold the bindings in place they may be easily removed when it is necessary to substitute new bindings for those which have been used and become worn out. When the bindings are applied to the jaws of a trap it is preferred to recess the gripping faces of the jaws to form seats of a depth corresponding to the thickness of the rubber or leather from which the bindings are formed so that when the bindings are applied the outer faces of their portions 8 will be flush with the end portions of the gripping faces of the jaws. By this arrangement the jaws may be fully closed when the latch is released and the spring expands to move the jaws towards each other. If, however, a trapper wishes to apply the improved bindings to traps already in use and does not desire to take the time and trouble to form seats in the gripping faces of the jaws to receive the portions 8 of the bindings, they may be disposed about the jaws as shown in Figure 4 with the portions 8 projecting from the jaws. Bindings so applied will be effective in preventing the leg bone of an animal from being broken or the flesh cut through by the sharp corners of the jaws but the bindings will more quickly become worn out. The outer faces of the portions 8 of the bindings may be left smooth as shown in Figure 1 or they may be roughened as shown at 14 in Figure 5 and thereby allow the leg of an animal to be very firmly gripped and likelihood of an animal wrenching its leg loose from between the jaws reduced to a minimum. I have therefore provided bindings for the jaws of a trap which may be very easily applied to a trap of a conventional construction and will serve very effectively to prevent the jaws from breaking the bone or cutting into the flesh of an animal's leg while at the same time allowing the jaws to very firmly grip the leg and hold the animal.

Having thus described the invention, I claim:

A trap having jaws each formed with transversely extending openings spaced from each other longitudinally of the jaws, bindings for said jaws, said bindings being U-shaped in cross section and straddling the jaws and having side walls formed with opposed openings registering with the openings in the jaws, and removable fasteners passed through the registering openings of the jaws and bindings and each having a head at one end and arms at its other end spread to a clinching position.

In testimony whereof I affix my signature.

JOHN W. MADDOX. [L. S.]